(12) United States Patent
Suma

(10) Patent No.: US 7,311,363 B2
(45) Date of Patent: Dec. 25, 2007

(54) BEARING APPARATUS FOR A WHEEL OF VEHICLE

(75) Inventor: Hiroto Suma, Shizuoka-ken (JP)

(73) Assignee: NTN Corporation (JP)

( * ) Notice: Subject to any disclaimer, the term of this patent is extended or adjusted under 35 U.S.C. 154(b) by 155 days.

(21) Appl. No.: 11/204,219

(22) Filed: Aug. 15, 2005

(65) Prior Publication Data
US 2006/0033381 A1    Feb. 16, 2006

(30) Foreign Application Priority Data
Aug. 16, 2004  (JP) ............................. 2004-236593

(51) Int. Cl.
*B60B 27/00*   (2006.01)
(52) U.S. Cl. .................... 301/105.1; 384/544
(58) Field of Classification Search ............ 301/105.1, 301/35.627, 35.621, 35.63; 384/544; 188/17, 188/218 R, 218 XL
See application file for complete search history.

(56) References Cited

U.S. PATENT DOCUMENTS

| | | | |
|---|---|---|---|
| 6,280,096 B1 * | 8/2001 | Miyazaki et al. | 384/544 |
| 6,485,109 B2 * | 11/2002 | Brinker et al. | 301/105.1 |
| 6,523,909 B1 * | 2/2003 | Nakamura et al. | 301/105.1 |
| 6,672,679 B2 * | 1/2004 | Kaneko | 301/105.1 |
| 6,829,825 B1 * | 12/2004 | Bowman et al. | 29/894.32 |
| 6,880,898 B2 * | 4/2005 | Nakamura et al. | 301/105.1 |
| 2004/0252927 A1 * | 12/2004 | Hirai et al. | 384/544 |

FOREIGN PATENT DOCUMENTS

| JP | 2002087008 A * | 3/2002 |
|---|---|---|
| JP | 2003-154801 | 5/2003 |

* cited by examiner

*Primary Examiner*—Jason R. Bellinger
*Assistant Examiner*—Kip Kotter
(74) *Attorney, Agent, or Firm*—Harness, Dickey & Pierce, P.L.C.

(57) ABSTRACT

A vehicle wheel bearing apparatus which improves the surface run-out of the wheel mounting flange to limit the generation of brake judder and also to increase the strength of the flange has a double row rolling bearing to rotatably support a wheel relative to a body of a vehicle. Double row rolling elements are between an inner member and an outer member. The inner member includes a wheel mounting flange, to secure the wheel via a brake rotor, and a cylindrical brake pilot portion, which extends from the wheel mounting flange to support the brake rotor. A plurality of hub bolts is press-fit into the wheel mounting flange along its circumference. The wheel mounting flange includes an annular recess portion recessed from the side surface of an outboard side at a base of the wheel mounting flange. The annular recess portion includes a corner region crossing the brake pilot portion which is formed with a predetermined hardened layer by high frequency induction quenching. The side surface is cut after the hub bolts are press fit into the wheel mounting flange.

5 Claims, 4 Drawing Sheets

Prior Art

BEARING APPARATUS FOR A WHEEL OF VEHICLE

CROSS-REFERENCE TO RELATED APPLICATION

This application claims priority to Japanese Patent Application No. 2004-236593, filed Aug. 16, 2004, which application is herein expressly incorporated by reference.

FIELD OF THE INVENTION

The present invention relates to a vehicle bearing apparatus, such as an automobile, to rotatably support a vehicle wheel, and more particularly to a bearing apparatus that improves the accuracy of surface run-out of a wheel mounting flange. This limits the generation of brake judder and increases the strength of the wheel mounting flange.

BACKGROUND OF THE INVENTION

In recent years, braking force has been increased due to disc brake spread. Contrary to this, sometimes uncomfortable low frequency noise, especially during traveling, is caused due to vibration of the brake rotor sandwiched between the brake pads. Such a phenomenon called "brake judder" has been noticed in development of high performance vehicle with less noise. Thus, it is a new technical object to analyze and improve the brake judder problem.

Although the mechanism which causes brake judder has not been clearly solved, it is believed that the accuracy of surface run-out of the brake rotor contacting the brake pads is one cause of brake judder. The accuracy of surface run-out of the brake rotor is influenced not only by the run-out accuracy of the brake rotor itself, but by accuracy of the surface run-out of the wheel mounting flange; axial run-out of the rolling bearing; accuracy of the raceway surfaces; and assembling accuracy of the rolling bearing; etc.

Recently in vehicle wheel bearing apparatus design, it is desired, on one hand, to reduce the weight and size, to reduce manufacturing cost and fuel consumption. On the other hand, there is a desire to increase rigidity to improve steering stability. Thus, the run-out accuracy of the brake rotor has to be solved to satisfy both matters which are contrary to one another.

FIG. 4 shows a vehicle wheel bearing apparatus. FIG. 4(a) is a side elevation view and FIG. 4(b) is its longitudinal cross-section view. In the description below, the term "outboard side" (a left-hand side in drawings) of the apparatus denotes a side which is positioned outside of the vehicle body. The term "inboard side" (a right-hand side in drawings) of the apparatus denotes a side which is positioned inside of the body when the bearing apparatus is mounted on the vehicle body.

This bearing apparatus has an inner member 51 with a wheel hub 52 and an inner ring 53. The wheel hub 52 has, at one end, an integrally formed wheel mounting flange 55 to mount a wheel (not shown) at the outboard side. An inner raceway surface 52a is formed on the outer circumferential surface of the wheel hub 52. An axially extending portion, of smaller diameter, extends from the inner raceway surface 52a. An inner ring 53 is press-fit onto the axially extending portion 54 of the wheel hub 52 to form an inner raceway surface 53a on the outer circumferential surface of the wheel hub. An outer member 60 is integrally formed with a body mounting flange 61 on its outer circumferential surface. The flange 61 is to be mounted on a body (not shown) of the vehicle. Double row raceway surfaces 60a, 60b are formed on its inner circumferential surface. Double row rolling elements (balls) 63, 63 are rollably held by cage 62 between the outer and inner raceway surfaces. Hub bolts 56, to secure a wheel on the flange, are arranged equidistantly along the circumference of the wheel mounting flange 55.

Seals 64, 65 are arranged at the ends of the outer member 60 to seal an annular space between the outer member 60 and the inner member 51. The seals 64, 65 prevent leakage of grease contained within the bearing as well as ingress of rain water or dust from the outside.

An annular groove 57 is formed on a side surface 55a of the wheel mounting flange 55 by a primary cut with a lathe. Bolt apertures 58 are equidistantly arranged in the annular groove 57 at substantially the middle of the width of the annular groove 57. The side surface 55a is finished by a secondary cut, e.g. with a lathe, after a knurled portion 56a of each hub bolt 56 has been press-fit into the bolt aperture 58.

In such a vehicle wheel bearing apparatus of the prior art, since the annular groove 57 is formed on the side surface 55a, it is possible to minimally limit influence due to deformation of the side surface 55a caused by the press-fit of the hub bolts 56. In addition, since the side surface 55a is finished by a secondary cut after press-fitting of the hub bolts 56, the surface run-out increased by the press-fit of the hub bolts can be substantially reduced. For example, see Japanese Laid-open Patent Publication No. 154801/2003.

SUMMARY OF THE INVENTION

However in the bearing apparatus mentioned above, when a large moment load is applied to the wheel mounting flange 55, during lateral turning of the vehicle, repeated alternate stress is generated on a surface of a base portion of the flange 55 at a corner region 59a between the flange 55 and a brake pilot portion 59. Although it is possible to simply increase the thickness of the wheel mounting flange 55 to improve its strength and durability, this is counterintuitive to reduce the weight and size of the bearing apparatus.

In addition, although it has been proposed to provide a hardening treatment by high frequency induction quenching on a surface of the corner region 59a where the alternate stress is generated, an expensive special tool is required to carry out the secondary cut of the hardening treated surface. Also, a step is created on the cut surface due to the cutting resistance difference between the hardened layer and the non-hardened layer. This lowers the surface accuracy of the wheel mounting flange.

Thus, the present invention provides a vehicle wheel bearing apparatus which improves the surface run-out of the wheel mounting flange to limit the generation of brake judder and also to increase the strength of the flange.

According to the invention, a vehicle wheel bearing apparatus comprises a double row rolling bearing to rotatably support a wheel relative to a body of a vehicle. Double row rolling elements are positioned between an inner member and an outer member. The inner member is formed with a wheel mounting flange, to secure the wheel via a brake rotor, and with a cylindrical brake pilot portion which extends from the wheel mounting flange to support the brake rotor. A plurality of hub bolts is press-fit into the wheel mounting flange along its circumference. The wheel mounting flange is formed with an annular recess portion recessed from the side surface of an outboard side at a base of the wheel mounting flange. The annular recess portion, which includes a corner region crossing the brake pilot portion, is formed with a predetermined hardened layer by high frequency induction quenching. The side surface is cut after the hub bolts are press-fit in the wheel mounting flange.

The characteristic features of the structure of the bearing apparatus is that the wheel mounting flange is formed with an annular recess portion recessed from the side surface of an outboard side at a base of the wheel mounting flange. The annular recess portion includes a corner region crossing the brake pilot portion, which is formed with a predetermined hardened layer by high frequency induction quenching. The side surface is cut after the hub bolts are press fit into the wheel mounting flange. This makes it possible to substantially limit the surface run-out increased by the press-fit of the hub bolts and also to increase the strength of the wheel mounting flange.

Preferably, the wheel mounting flange is formed with an annular groove of predetermined width at a region where the hub bolts are press-fit at the outboard side of the wheel mounting flange. Such a structure provides minimal affects to limit the side surface of the wheel mounting flange, such as by deformation of the flange caused by press-fit of the hub bolts.

According to the invention, the width of the annular recess portion is set to have a dimension of at least 10 mm or more. The depth of the annular recess portion is set to have a dimension larger than the cutting allowance of the cut carried out after the press-fit of the hub bolts. This makes it possible to include the region influenced by the heat treatment within the annular recess portion and to prevent the surface accuracy of the side surface from being lowered because of the region influenced by the heat treatment being cut during the finishing cut.

According to the invention, the surface hardness of the hardened layer is set to have a hardness within a range of 50~64 HRC. Thus residual compressive stress formed in the surface of the hardened layer and accordingly the fatigue strength of the base of the wheel mounting flange can be remarkably increased.

According to the invention, the surface run-out of the side surface of the wheel mounting flange at its outboard side is limited below 20 µm. This enables the surface run-out of the side surface of the brake rotor to be limited below a desired value and thus suppress the generation of brake judder.

The vehicle wheel bearing apparatus of the present invention comprises a double row rolling bearing to rotatably support a wheel relative to a body of a vehicle. The bearing includes double row rolling elements between an inner member and an outer member. The inner member is formed with a wheel mounting flange, to secure the wheel via a brake rotor, and with a cylindrical brake pilot portion which extends from the wheel mounting flange to support the brake rotor. A plurality of hub bolts is press-fit into the wheel mounting flange along the circumference. The wheel mounting flange is formed with an annular recess portion recessed from the side surface of the outboard side at a base of the wheel mounting flange. The annular recess portion includes a corner region crossing the brake pilot portion formed with a predetermined hardened layer. The layer is formed by high frequency induction quenching. The side surface is cut after the hub bolts are press fit into the wheel mounting flange. This bearing apparatus makes it possible to substantially limit the surface run-out increased by the press-fit of the hub bolts and also to increase the strength of the wheel mounting flange.

To carry out the present invention, a vehicle wheel bearing apparatus comprises a double row rolling bearing to rotatably support a wheel relative to a vehicle body. The bearing includes double row rolling elements between an inner member and an outer member. The inner member is formed with a wheel mounting flange, to secure the wheel via a brake rotor, and with a cylindrical brake pilot portion which extends from the wheel mounting flange to support the brake rotor. A plurality of hub bolts is press-fit into the wheel mounting flange along the circumference. The wheel mounting flange is formed with an annular recess portion recessed from the side surface of an outboard side at a base of the wheel mounting flange. The annular recess portion includes a corner region crossing the brake pilot portion which is formed with a predetermined hardened layer by high frequency induction quenching. The side surface is cut after the hub bolts are press fit into the wheel mounting flange.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

The following description of the preferred embodiment(s) is merely exemplary in nature and is in no way intended to limit the invention, its application, or uses.

Figure 1:
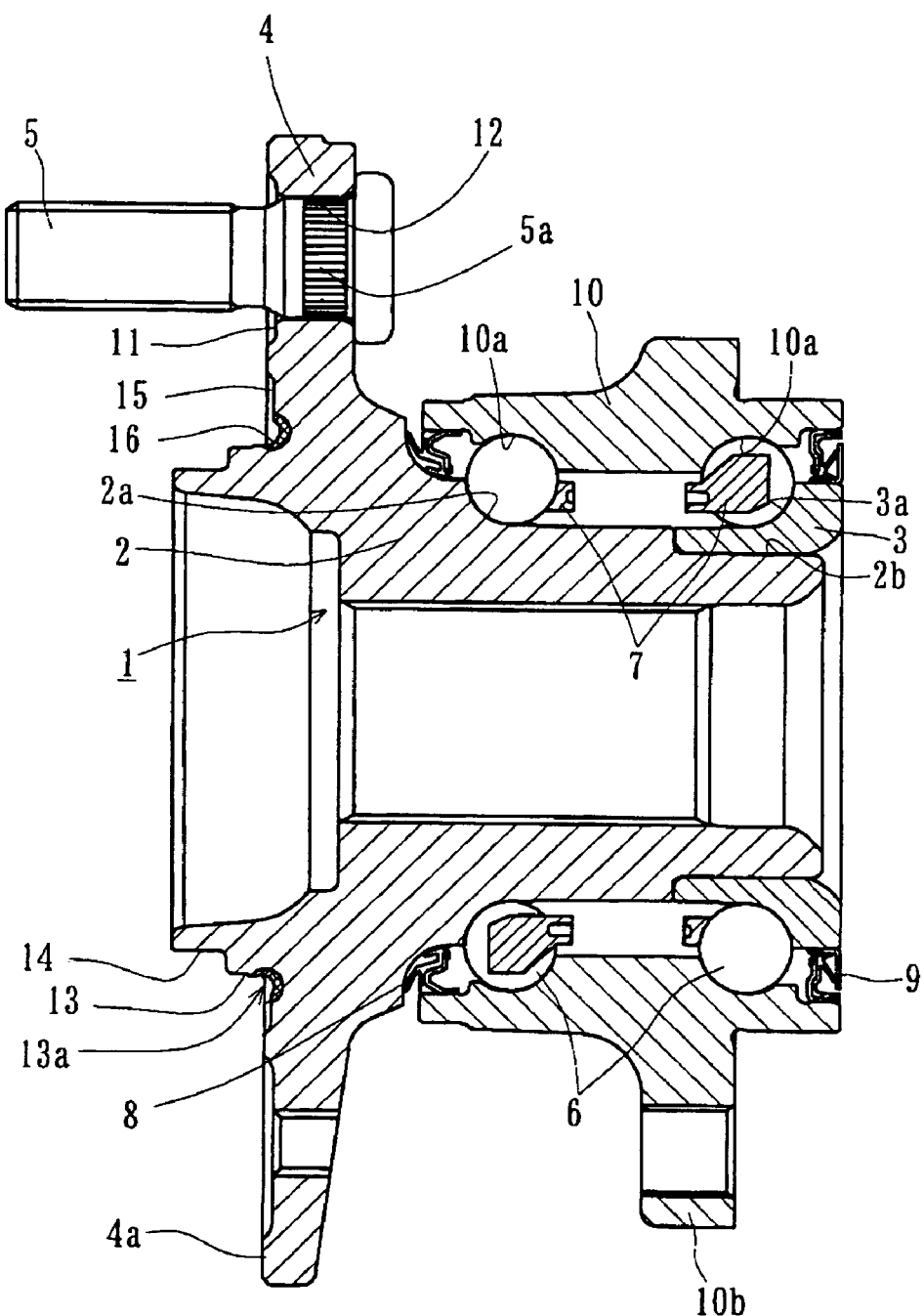
FIG. 1 is a longitudinal section view of a first embodiment of a vehicle wheel bearing apparatus of the present invention.
Figure 2:
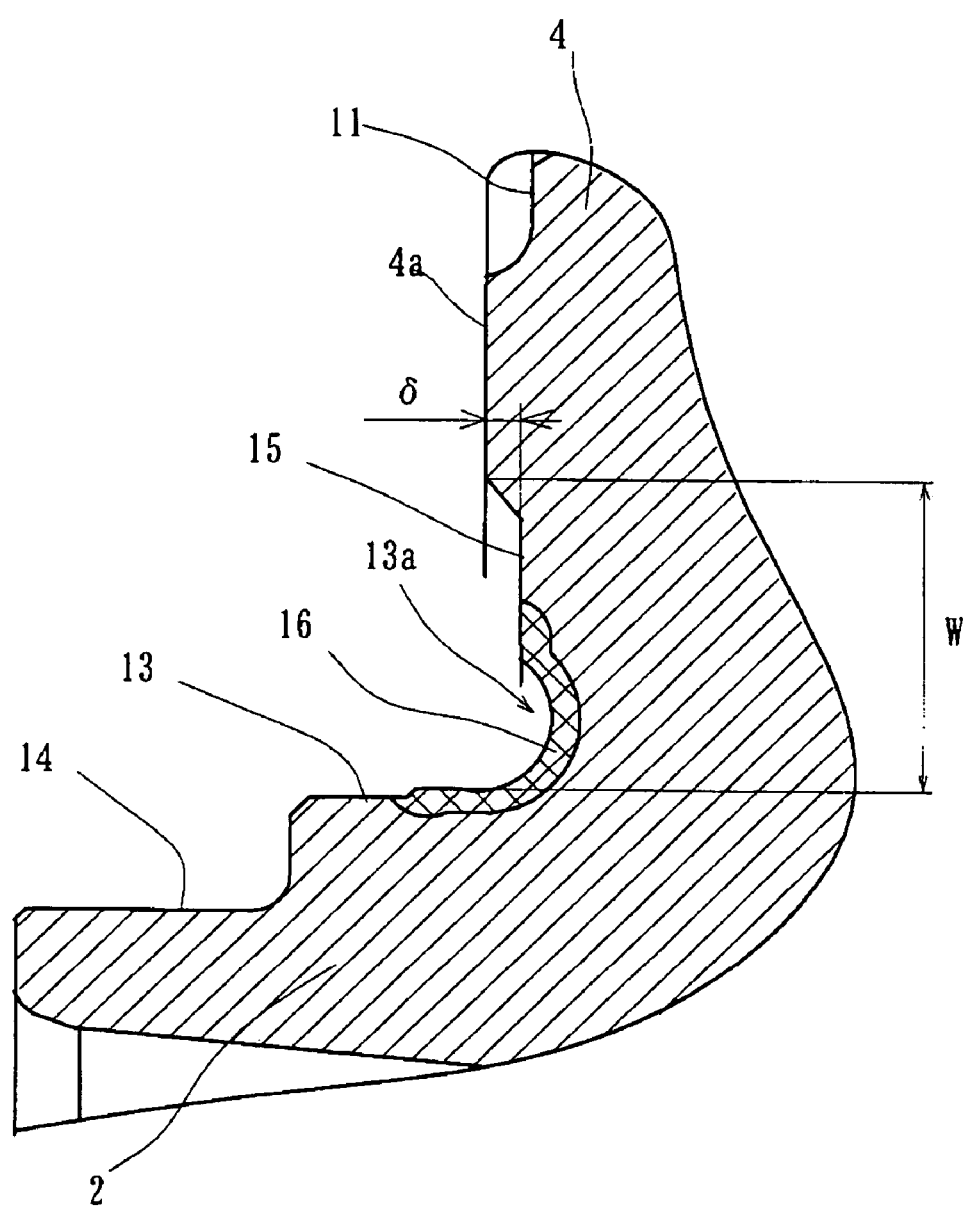
FIG. 2 is a partially enlarged view of FIG. 1.

FIG. 1 is a longitudinal cross-section of a first embodiment of a vehicle wheel bearing apparatus of the present invention. FIG. 2 is a partially enlarged view of FIG. 1.

The vehicle wheel bearing apparatus comprises an inner member 1, an outer member 10, and double row rolling elements (balls) 6. The inner member 1 includes a wheel hub 2 and a separate inner ring 3 press-fit onto an axially extending portion 2b formed on the wheel hub 2 at its inboard side. The wheel hub 2 is formed with an inner raceway surface 2a, at its outboard side, on its outer circumferential surface. The inner ring 3 is formed with an inner raceway surface 3a, on its inboard side, on its outer circumferential surface. The wheel hub 2 is integrally formed, at its outboard side, with a wheel mounting flange 4 to mount a wheel (not shown). Hub bolts 5, to secure the wheel on the flange 4, are press-fit into the flange equidistantly along the circumference of the flange 4.

The outer member 10 integrally includes a body mounting flange 10b on its outer circumferential surface. The body mounting flange 10b mounts the outer member 10 onto a body (not shown). Double row outer raceway surfaces 10a are also formed on its inner circumferential surface. Double row rolling elements 6, equidistantly arranged in cages 7, are freely rollably held between the outer and inner raceway surfaces (10*a*) and (2*a*, 3*a*).

Seals 8 and 9 are arranged at the ends of the outer member 10 to seal an annular space formed between the outer and inner members 10 and 1. The seals 8, 9 prevent leakage of grease contained within the bearing as well as ingress of rain water or dusts from the outside.

The wheel hub 2 is made of medium carbon steel including carbon of 0.40~0.80% by weight such as S53C. The wheel hub 2 includes a hardened layer having a surface hardness of about 58~64 HRC. The layer is formed by high frequency induction hardening at the inner raceway surface 2*a*, a seal land portion where the sealing means 8 contacts, and an axially extending portion 2*b*. Such a high frequency induction hardening improves the strength of the wheel hub 2 and the durability of the inner ring 3 with reduction of fretting wear at the fitting surface of the inner ring 3.

The inner ring 3 is made of high carbon chrome bearing steel such as SUJ2. The inner ring 3 is hardened to its core by dip quenching to have a surface hardness of about 58~64 HRC. The outer member 10 is made of medium carbon steel including carbon of 0.40~0.80% by weight such as S53C. Double raceway surfaces 10*a* are hardened by high frequency induction quenching to have a surface hardness of about 58~64 HRC.

An annular groove 11 is formed on a side surface 4*a* of the wheel mounting flange 4 by a primary cut with a lathe. Bolt apertures 12 are circumferentially equidistantly arranged in the annular groove 11 at substantially the middle of the width of the annular groove 11. Hub bolts 5 are press-fit into the bolt apertures 12 and are rigidly secured thereto by a knurled portion 5*a* of each bolt 5 biting into the aperture 12. It is not necessary for the bolt apertures 12 to be positioned at middle of the width of the annular groove 11 as long as the apertures 12 are positioned within the groove 11.

The wheel hub 2 is integrally formed with a cylindrical brake pilot portion 13 and a wheel pilot portion 14 which extend from the wheel mounting flange 4 toward the outboard side. The brake pilot portion 13 and the wheel pilot portion 14 support a brake rotor and a wheel (not shown), respectively, in the radial direction.

As shown in an enlarged view of FIG. 2, according to the present embodiment, the wheel mounting flange 4 is formed with an annular recess portion 15 recessed from the side surface 4*a* of the outboard side at a base of the wheel mounting flange 4. The annular recess portion 15 includes an axially inward corner region 13*a* crossing the brake pilot portion 13 to form an arc shaped undercut. A predetermined hardened layer 16 (shown by cross-hatching) is also formed in the annular recess portion 15 which includes the corner region 13*a*, by high frequency induction quenching. The illustrated corner region 13*a* is formed as an undercut in order to avoid interference with the corner of the brake rotor. However in due consideration of the notch effect, it may be formed as a large arc having a radius able to avoid interference with the brake rotor.

The width W of the annular recess portion 15 is set to have a dimension of at least 10 mm or more. The depth δ of the annular recess portion is set to have a dimension larger than the cutting allowance of a secondary cut of the side surface 4*a*. By setting the width W of the annular recess portion 15 at least 10 mm or more, it is possible to include the region influenced by the heat treatment within the annular recess portion 15. By setting the depth δ of the annular recess portion 15 at a dimension larger than the cutting allowance of a secondary cut, the annular recess portion cannot be cut during the secondary cut of the side surface 4*a* and thus, it is possible to prevent the surface accuracy of the side surface from being lowered.

The surface hardness of the hardened layer 16 is set at about 50~64 HRC, preferably 54~60 HRC. Thus a martensitic layer having very fine grains peculiar to the high frequency induction hardening is formed at its surface. The rate of martensitic structure is reduced toward the inside of the hardened layer 16 and its center remains in a pre-quenching metallographic structure. Accordingly, a residual compressive stress is generated in the surface of the corner region 13*a* and thus the fatigue strength of the base of the wheel mounting flange 4 can be remarkably increased. The residual compressive stress and the surface hardness have a correlation to each other. Thus, when the surface hardness exceeds 64 HRC, deformation caused by heat treatment is undesirably increased. On the other hand, when the surface hardness is below 50 HRC, the effect of strength increase by the hardened layer 16 cannot be expected.

In the present embodiment, the hub bolts 5 are press-fit into their apertures 12 on the wheel mounting flange 4 after the corner region 13*a* of the flange 4 has been heat treated. The side surface 4*a* on which the brake rotor is mounted is finished by the secondary cut with a lathe. The surface run-out of the side surface 4*a* is limited below 20 μm by the secondary cut. Accordingly, the accuracy of the side surface of the brake rotor can be limited below 50 μm. Thus, generation of brake judder can also be limited. The secondary cut may be carried out by a milling machine or grinding machine other than a lathe.

According to the present embodiment, influences to the side surface 4*a* of the wheel mounting flange 4 such as deformation of the side surface 4*a* caused by the press-fit of the hub bolts 5 can be limited to a minimum by the provision of an annular groove 11 in the side surface 4*a* of the wheel mounting flange 4. In addition, formation of the predetermined annular recess portion 15 at the base of the wheel mounting flange 4 at the outboard side, formation of the predetermined hardened layer 16 in the annular recess portion 15 by high frequency induction quenching, and the secondary cut of the side surface 4*a* after press-fit of the hub bolts 5 effectively contribute to suppressing the surface run-out of the side surface 4*a* as well as to the increase of strength of the wheel mounting flange 4.

An embodiment has been described where the side surface 4*a* of the wheel mounting flange is cut primarily prior to the press-fit of the hub bolts 5. The annular recess portion 15 is formed at the base of the wheel mounting flange 4. The hub bolts 5 are press-fit into the wheel mounting flange after formation of the hardened layer 16 at the annular recess portion 15. The side surface 4*a* of the wheel mounting flange is finished by the secondary cut. However the present invention is not limited in such an embodiment and thus it is possible to carry out a primary cut including a roughing cut and a middle-finishing cut prior to the press-fit of the hub bolts 5. The secondary cut (finishing cut) is carried out after the press-fit of the hub bolts 5. In addition, it is also possible to carry out the finishing cut after the press-fit of the hub bolts 5, keeping a forged surface of the wheel hub 2, without any cut prior to the press-fit of the hub bolts 5. That is, the number of cuts does not have any relation to the present invention and thus it is required only to cut the side surface 4*a* after the press-fit of the hub bolts 5.

Figure 3:
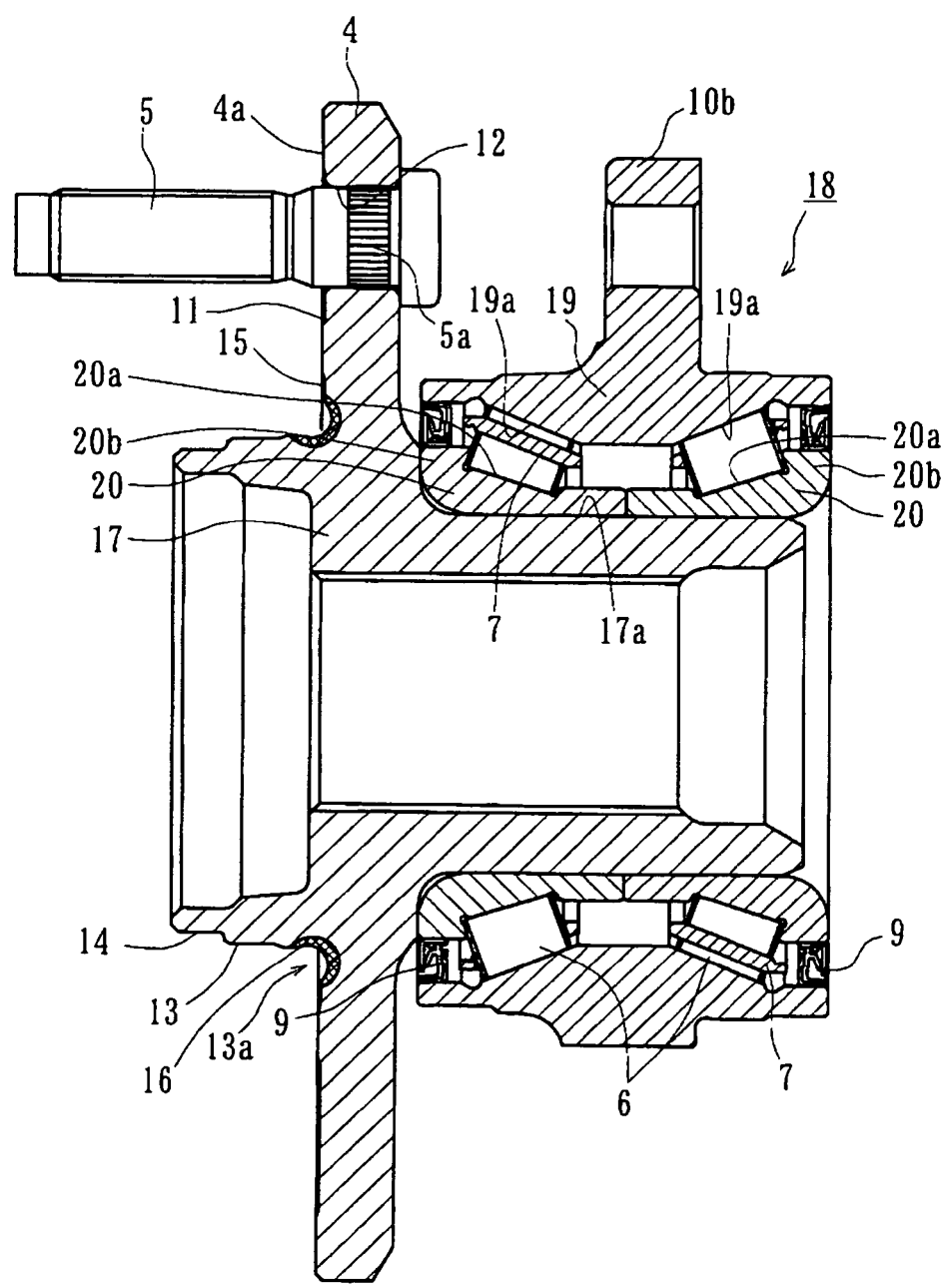
FIG. 3 is a longitudinal section view of a second embodiment of a vehicle wheel bearing apparatus of the present invention.
Figure 4:
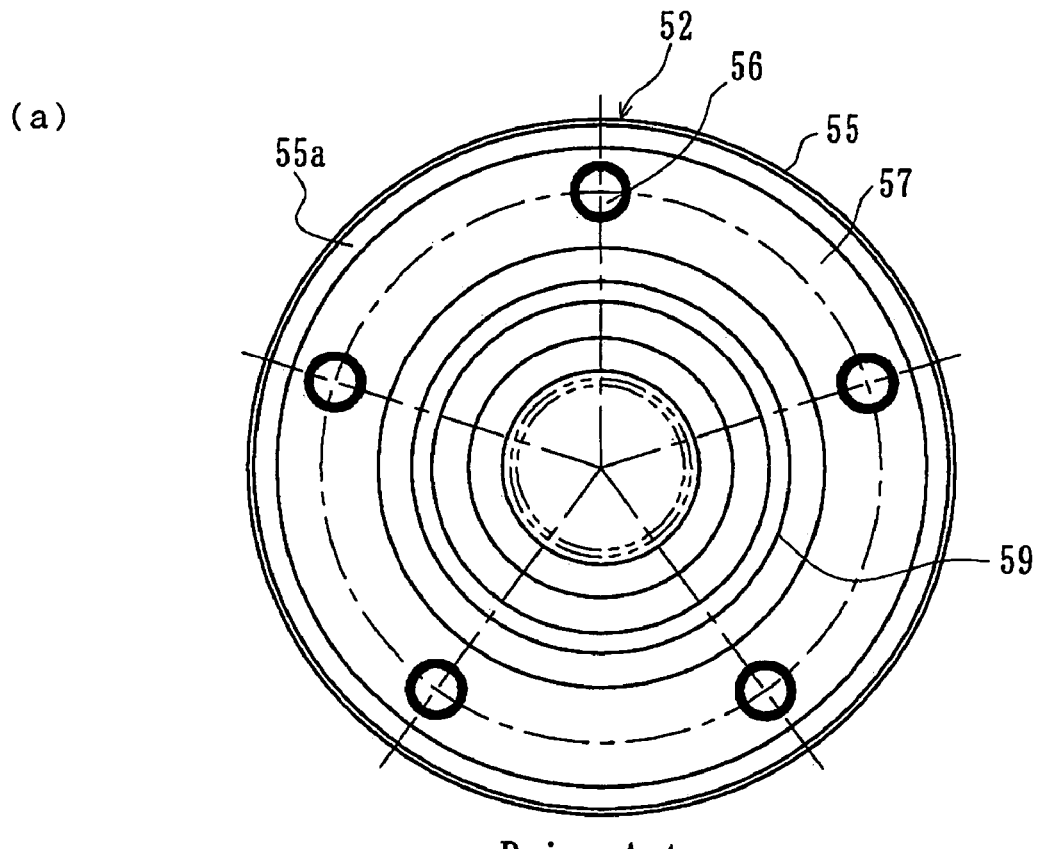
FIG. 4(a) is a side elevation view of a prior art vehicle wheel bearing apparatus.
FIG. 4(b) is a longitudinal section view of FIG. 4(a).
Figure 4:
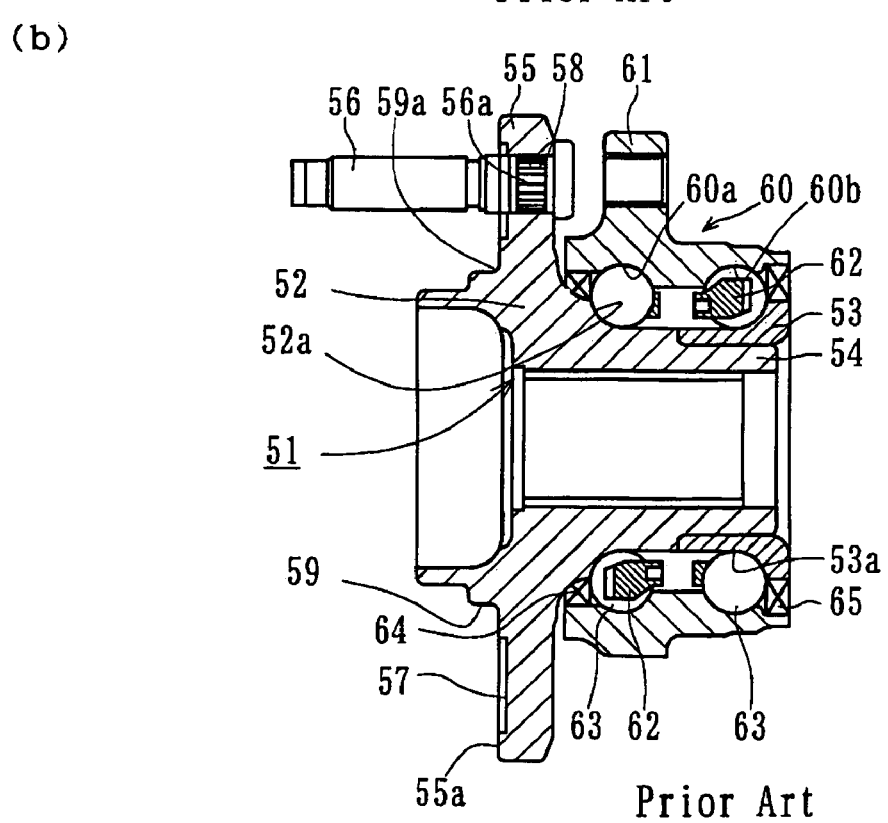

FIG. 3 is a longitudinal cross-section view of a second embodiment of the vehicle wheel bearing apparatus of the present invention. The same reference numerals are used to designate the same parts as those in the first embodiment.

This bearing apparatus is a so called "second generation" type and includes a wheel hub 17 and a double row rolling bearing 18.

The wheel hub 17 is integrally formed with a wheel mounting flange 4 and an axially extending cylindrical portion 17a. The cylindrical portion 17a extends from the wheel mounting flange 4. The double row rolling bearing 18 is press-fit onto the axially extending portion 17a, via a predetermined interference.

The double row rolling bearing 18 includes an outer member 19 integrally formed with a body mounting flange 10b and tapered outer raceway surfaces 19a on its inner circumferential surface. A pair of inner rings 20, each formed with a tapered inner raceway surface 20a, is arranged opposite to the outer raceway surface 19a. Double row rolling elements (tapered rollers) 6 are maintained between the inner and outer raceway surfaces 20a, 19a. Cages 7 freely rollably hold the rolling elements 6.

A large flange 20b is formed on each inner ring 20 at its end of larger diameter to guide the rolling elements 6. The pair of inner rings 20 is fitted onto the axially extending portion 17a with their smaller ends abutting each other to form a double row tapered roller bearing of a back-to-back duplex type.

The wheel hub 17 is made of medium carbon steel including carbon of 0.40~0.80% by weight such as S53C. A region, extending from a base of the wheel mounting flange 4 at the inboard side to the axially extending portion 17a, is heat treated by high frequency induction quenching to have a surface hardness of about 58~64 HRC. Such a high frequency induction hardening can improves the durability of the wheel hub 17 and prevent fretting wear at the axially extending portion 17a.

The outer member 19, similar to the wheel hub 17, is made of medium carbon steel including carbon of 0.40~0.80% by weight such as S53C. The double row raceway surfaces 19a are hardened by high frequency induction quenching to have a surface hardness of about 58~64 HRC. On the other hand, each of the inner rings 20 is made of high carbon chrome bearing steel such as SUJ2. The inner rings 20 are hardened through their core by dip quenching to have a surface hardness of about 58~64 HRC.

The side surface 4a, on which the brake rotor is mounted, is finished by the secondary cut after the heat treatment of the corner region 13a of the wheel mounting flange 4. Its surface run-out is limited below 20 μm. This enables the accuracy of the side surface of the brake rotor to be limited to below 50 μm. Thus, this limits the generation of the brake judder.

As described above, influences to the side surface 4a such as deformation caused by press-fitting of hub bolts 5 can be limited to a minimum by forming the annular groove 11 on the side surface 4a of the wheel mounting flange 4. In addition, formation of the predetermined annular recess portion 15 at the base of the wheel mounting flange 4 at the outboard side, formation of the predetermined hardened layer 16 in the annular recess portion 15 by high frequency induction quenching, and the secondary cut of the side surface 4a after press-fit of the hub bolts 5 effectively contribute to suppressing the surface run-out of the side surface 4a as well as to the increase of strength of the wheel mounting flange 4, even though the bearing apparatus is that of the second generation type where the base of the wheel mounting flange 4 has a small material thickness.

The vehicle wheel bearing apparatus of the present invention can be applied to any type of bearing apparatus of first through fourth generations which have a wheel hub integrally formed with a wheel mounting flange, at one end of the wheel hub, and a double row rolling bearing to rotatably support a wheel.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A vehicle wheel bearing apparatus comprising:
   a double row rolling bearing for rotatably supporting a wheel relative to a body of a vehicle including double row rolling elements between an inner member and an outer member,
   said inner member includes a wheel mounting flange, for securing the wheel via a brake rotor, and a cylindrical brake pilot portion extending from the wheel mounting flange for supporting the brake rotor,
   a plurality of hub bolts are press-fit into the wheel mounting flange along its circumference;
   said wheel mounting flange includes an annular recess portion recessed from the side surface, of an outboard side, at a base of the wheel mounting flange said recess having a width of at least 10 mm,
   said annular recess portion includes a corner region axially inward of said recess to form an undercut, said corner region crossing the brake pilot portion which is formed with a predetermined hardened layer by high frequency induction quenching; and
   said side surface is cut after the hub bolts have been press fit into the wheel mounting flange.

2. The vehicle wheel bearing apparatus of claim 1, wherein the wheel mounting flange includes an annular groove of predetermined width at a region where the hub bolts are press-fit at the outboard side of the wheel mounting flange.

3. The vehicle wheel bearing apparatus of claim 2, wherein the width of the annular recess portion is set to have a dimension of at least 10 mm or more, and the depth of the annular recess portion is set to have a dimension larger than the cutting allowance of the cut carried out after the press-fit of the hub bolts.

4. The vehicle wheel bearing apparatus of claim 1, wherein the surface hardness of the hardened layer is set to have a hardness within a range of about 50~64 HRC.

5. The vehicle wheel bearing apparatus of claim 1, wherein the surface run-out of the side surface of the wheel mounting flange at its outboard side is limited below 20 μm.

* * * * *